US012062346B2

(12) United States Patent
Li et al.

(10) Patent No.: US 12,062,346 B2
(45) Date of Patent: Aug. 13, 2024

(54) DRIVING SUBSTRATE WITH ROW SCANNING LINE, DISPLAY PANEL, AND DISPLAY DEVICE

(71) Applicant: HKC CORPORATION LIMITED, Shenzhen (CN)

(72) Inventors: Zeyao Li, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/078,039

(22) Filed: Dec. 8, 2022

(65) Prior Publication Data

US 2023/0386425 A1 Nov. 30, 2023

(30) Foreign Application Priority Data

May 25, 2022 (CN) ........................ 202210583544.X

(51) Int. Cl.
*G09G 3/36* (2006.01)
*G09G 3/32* (2016.01)

(52) U.S. Cl.
CPC ............. *G09G 3/3677* (2013.01); *G09G 3/32* (2013.01); *G09G 3/3688* (2013.01);
(Continued)

(58) Field of Classification Search
CPC ............. G09G 3/32–3291; G09G 3/36; G09G 3/3611; G09G 3/3648; G09G 3/3659;
(Continued)

(56) References Cited

U.S. PATENT DOCUMENTS 9,542,901 B2 * 1/2017 Kim ..................... G09G 3/3677
2015/0221272 A1 * 8/2015 Xu ....................... G09G 3/3648
345/92

(Continued)

FOREIGN PATENT DOCUMENTS

CN 101123257 A 2/2008
CN 102621758 A 8/2012

(Continued)

OTHER PUBLICATIONS

Chinese Rejection decision,Application No. 202210583544X,mailed Jun. 2, 2023 (14 pages).

(Continued)

*Primary Examiner* — Nathan Danielsen

(57) ABSTRACT

Disclosed are a driving substrate, a display panel, and a display device. The driving substrate is applied to a display panel and includes a base; data lines and row scanning lines, arranged on a side of the base; and a scanning driving circuit, arranged on the side of the base and including a plurality of scanning driving units that are cascaded. Each row scanning line includes at least two sub-scanning lines, and the scanning driving circuit is configured to output a gate scanning signal to each sub-scanning line. The present disclosure may save power by dividing each row scanning line into multiple sub-scanning lines and separately outputting the gate scanning signal for each sub-scanning line, making it possible to drive only part of the thin-film transistor in each row when only part of the display region of the display panel is used for displaying images.

20 Claims, 5 Drawing Sheets

(52) U.S. Cl.
CPC ............... *G09G 2300/0408* (2013.01); *G09G 2300/0426* (2013.01); *G09G 2310/0267* (2013.01); *G09G 2310/0275* (2013.01); *G09G 2310/0286* (2013.01); *G09G 2320/0233* (2013.01); *G09G 2330/021* (2013.01)

(58) Field of Classification Search
CPC ..... G09G 3/3666; G09G 3/3674–3696; G09G 2300/0404; G09G 2300/0408; G09G 2300/0421; G09G 2300/0426; G09G 2300/08; G09G 2300/0809; G09G 2300/0814; G09G 2310/0202; G09G 2310/0213; G09G 2310/0218; G09G 2310/0221; G09G 2310/0243; G09G 2310/0262; G09G 2310/0267; G09G 2310/0275; G09G 2310/0283; G09G 2310/0286; G09G 2310/04; G09G 2310/06; G09G 2310/08; G09G 2320/0233; G09G 2320/0686; G09G 2330/021
See application file for complete search history.

(56) References Cited

U.S. PATENT DOCUMENTS

2016/0019856 A1* 1/2016 Tanaka ................. G09G 3/3666 345/206
2017/0025070 A1* 1/2017 Kang ................... G09G 3/3233
2017/0316730 A1* 11/2017 Cheng .................. G09G 3/2092
2018/0075808 A1* 3/2018 Yamashita ........... G09G 3/3266
2018/0138256 A1* 5/2018 Han ...................... G09G 3/3225
2021/0201818 A1* 7/2021 Jang ...................... G09G 3/2088
2021/0202677 A1* 7/2021 Kim ...................... G09G 3/3291
2021/0295797 A1* 9/2021 Duan ................... G09G 3/3266
2021/0327336 A1* 10/2021 Wang ........................ G09G 3/20
2022/0139335 A1* 5/2022 Lee ....................... G09G 3/3266 345/690

FOREIGN PATENT DOCUMENTS

CN 103268753 A 8/2013
CN 104155820 A 11/2014
CN 104575384 A 4/2015
CN 108520721 A 9/2018
CN 106898324 B 9/2019
CN 111522161 A 8/2020

OTHER PUBLICATIONS

Chinese First Office Action,Chinese Application No. 202210583544.X, mailed Feb. 6, 2023 (14 pages).
Chinese second Office Action,Chinese Application No. 202210583544.X, mailed Apr. 3, 2023 (13 pages).

* cited by examiner

DRIVING SUBSTRATE WITH ROW SCANNING LINE, DISPLAY PANEL, AND DISPLAY DEVICE

CROSS REFERENCE

The present application claims priority of Chinese Patent Application No. 202210583544.X, filed on May 25, 2022, the entire contents of which are hereby incorporated by reference in its entirety.

TECHNICAL FIELD

The present disclosure relates to the field of display technologies, and in particular to a driving substrate, display panel, and display device.

BACKGROUND

Conventional displays include light emitting diode (LED) displays, liquid crystal display (LCD). The driving circuits of these displays include multiple rows of scanning lines, multiple thin film transistor (TFT) arrays controlled by the multiple rows of scanning lines, and a scanning driving circuit.

In the related art, the scanning driving circuit is arranged in a non-display region and is connected to the multiple rows of scanning lines to drive the TFTs by the multiple rows of scanning lines. However, since the same row of pixel cells is controlled by the same row of scanning line, it is necessary to drive a whole row of TFTs even if only part of the display region of the display is used for displaying images, resulting in wasted power.

SUMMARY OF THE DISCLOSURE

The present disclosure provides a driving substrate, a display panel, and a display device, to solve the problem in the related art that even if only part of the display region of the display is used for displaying images, a whole row of thin-film transistors needs to be driven, resulting in wasted power.

To solve the above technical problem, the present disclosure provides a driving substrate applied to a display panel and including a base; a plurality of data lines and a plurality of row scanning lines, arranged on a side of the base; and a scanning driving circuit, arranged on the side of the base and including a plurality of scanning driving units that are cascaded. Each row scanning line includes at least two sub-scanning lines, and the scanning driving circuit is configured to output a gate scanning signal to each sub-scanning line.

In some embodiments, for each sub-scanning line: the sub-scanning line is connected to an output end of each of two of the plurality of scanning driving units, such that the scanning driving circuit is configured to output the gate scanning signal to the sub-scanning line through the two of the plurality of scanning driving units.

In some embodiments, each of opposite ends of the sub-scanning line is connected to the output end of a corresponding one of the two of the plurality of scanning driving units; the output end of each scanning driving unit is connected to a corresponding sub-scanning line of each of at least one of the plurality of row scanning lines.

In some embodiments, for each row scanning line, the at least two sub-scanning lines are equally divided; each row scanning line has a same number N of the at least two sub-scanning lines; for each row scanning line, a segmented position is located between each two of the at least two sub-scanning lines, and the segmented positions of the row scanning line are defined as a $1^{st}$ segmented position, a $2^{nd}$ segmented position, a $3^{rd}$ segmented position, . . . , and an $N-1^{th}$ segmented position, along an extension direction of the row scanning line; the $1^{st}$ segmented position of each row scanning line is located in a same line along an extension direction of the plurality of data lines, the $2^{nd}$ segmented position of each row scanning line is located in another same line along the extension direction of the plurality of data lines, the $3^{rd}$ segmented position of each row scanning line is located in another same line along the extension direction of the plurality of data lines, . . . , and the $N-1^{th}$ segmented position of each row scanning line is located in another same line along the extension direction of the plurality of data lines.

In some embodiments, for each row scanning line, the number of the at least two sub-scanning lines of the row scanning line is different from the number of the at least two sub-scanning lines of another row scanning line adjacent to the row scanning line; a segmented position is located between each two of the at least two sub-scanning lines of each row scanning line, and for each row scanning line: the segmented positions of the row scanning line are staggeredly arranged with the segmented positions of another row scanning line adjacent to the row scanning line along an extension direction of the plurality of data lines.

In some embodiments, the plurality of row scanning lines are defined as a $1^{st}$ row scanning line, a $2^{nd}$ row scanning line, a $3^{rd}$ row scanning line, . . . , along the extension direction of the plurality of data lines, such that the plurality of row scanning lines are divided into an odd-numbered row scanning line group and an even-numbered row scanning line group; each row scanning line in the odd-numbered row scanning line group has a same first number of the at least two sub-scanning lines, and each row scanning line in the even-numbered row scanning line group has a same second number of the at least two sub-scanning lines, the first number being different from the second number.

In some embodiments, an interval between each adjacent two of the at least two sub-scanning lines of one of the plurality of row scanning lines is arranged with a floating joint section; an end of the floating joint section faces and is insulated with an end of one of the corresponding adjacent two sub-scanning lines near the end of the floating joint section, and another end of the floating joint section faces and is insulated with an end of the other of the corresponding adjacent two sub-scanning lines near the end of the floating joint section.

In some embodiments, the plurality of data lines and the plurality of row scanning lines cross longitudinally and horizontally to define a plurality of pixel regions, and each scanning driving unit is arranged in at least two of the plurality of pixel regions; the at least two of the plurality of pixel regions are located in different rows.

In some embodiments, the plurality of data lines and the plurality of row scanning lines cross longitudinally and horizontally to define a plurality of pixel regions, a row direction of the plurality of pixel regions is parallel to the plurality of row scanning lines, and only one of each two adjacent rows of the plurality of pixel regions is arranged with corresponding ones of the plurality of scanning driving units.

To solve the above technical problem, the present disclosure further provides a display panel, including the driving substrate as above.

To solve the above technical problem, the present disclosure further provides a display device, including a central control circuit and the display panel as above; wherein the central control circuit is connected to the display panel and is capable of individually output a control signal to at least one of the plurality of scanning driving units that is connected to each sub-scanning line.

Beneficial effect of the present disclosure: differing from the related art, the present disclosure provides a driving substrate, a display panel, and a display device. The driving substrate is applied to a display panel and includes a base; a plurality of data lines and a plurality of row scanning lines, arranged on a side of the base; and a scanning driving circuit, arranged on the side of the base and including a plurality of scanning driving units that are cascaded. Each row scanning line includes at least two sub-scanning lines, and the scanning driving circuit is configured to output a gate scanning signal to each sub-scanning line. The present disclosure may save power by dividing each row scanning line into multiple sub-scanning lines and separately outputting the gate scanning signal for each sub-scanning line, making it possible to drive only part of the thin-film transistor in each row when only part of the display region of the display panel is used for displaying images.

BRIEF DESCRIPTION OF THE DRAWINGS

In order to more clearly illustrate the technical solutions in the embodiments of the present disclosure, a brief description of the accompanying drawings to be used in the description of the embodiments will be given below. It will be obvious that the accompanying drawings in the following description are only some embodiments of the present disclosure, and that other accompanying drawings may be obtained on the basis of these drawings without any creative effort for those skilled in the art.

DETAILED DESCRIPTION

The technical solutions in the embodiments of the present disclosure will be described in detail below in conjunction with the specification and accompanying drawings of the present disclosure.

In the following description, specific details such as particular system structures, interfaces, techniques, etc., are presented for the purpose of illustration and not for the purpose of limitation, in order to provide a thorough understanding of the present disclosure.

The technical solutions in the embodiments of the present disclosure will be clearly and completely described below with reference to the specification and drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative efforts shall fall within the scope of the present disclosure.

The terms "first", "second", and "third" in the present disclosure are intended for descriptive purposes only and are not to be construed as indicating or implying relative importance or implicitly specifying the number of indicated technical features. Therefore, a feature defined with "first", "second", or "third" may explicitly or implicitly include at least one such feature. In the description of the present disclosure, "plurality" means at least two, e.g., two, three, etc., unless otherwise expressly and specifically limited. All directional indications (such as up, down, left, right, forward, backward) in the present disclosure are intended only to explain the relative position relationship, movement, etc. between components in a particular attitude (as shown in the accompanying drawings). If the particular attitude is changed, the directional indications are changed accordingly. In addition, the terms "include" and "have" and any variations thereof are intended to cover non-exclusive inclusion. For example, a process, method, system, product, or apparatus including a series of steps or units is not limited to the listed steps or units, but optionally further includes steps or units not listed, or optionally further includes other steps or units inherent to the process, method, product, or apparatus.

References herein to "embodiments" mean that particular features, structures, or characteristics described in connection with an embodiment may be included in at least one embodiment of the present disclosure. The presence of the phrase at various points in the specification does not necessarily mean the same embodiment, nor is it a separate or alternative embodiment that is mutually exclusive with other embodiments. It is understood, both explicitly and implicitly, by those skilled in the art that the embodiments described herein may be combined with other embodiments.

Figure 1:
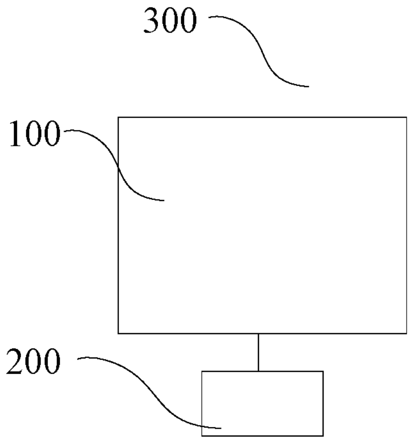
FIG. 1 is a structural schematic view of a display device according to an embodiment of the present disclosure.

Referring to FIG. 1, FIG. 1 is a structural schematic view of a display device according to an embodiment of the present disclosure.

The present disclosure provides a display device 300, and the display device 300 includes a display panel 100 and a central control circuit 200. The central control circuit 200 is connected to the display panel 100 for controlling the operation of the display panel 100. The display device 300 may be classified as a liquid crystal display (LCD) display device, a light emitting diode (LED) display device, etc. It can be understood that the light emitting diode may be replaced by other current-driven light-emitting elements.

Figure 2:
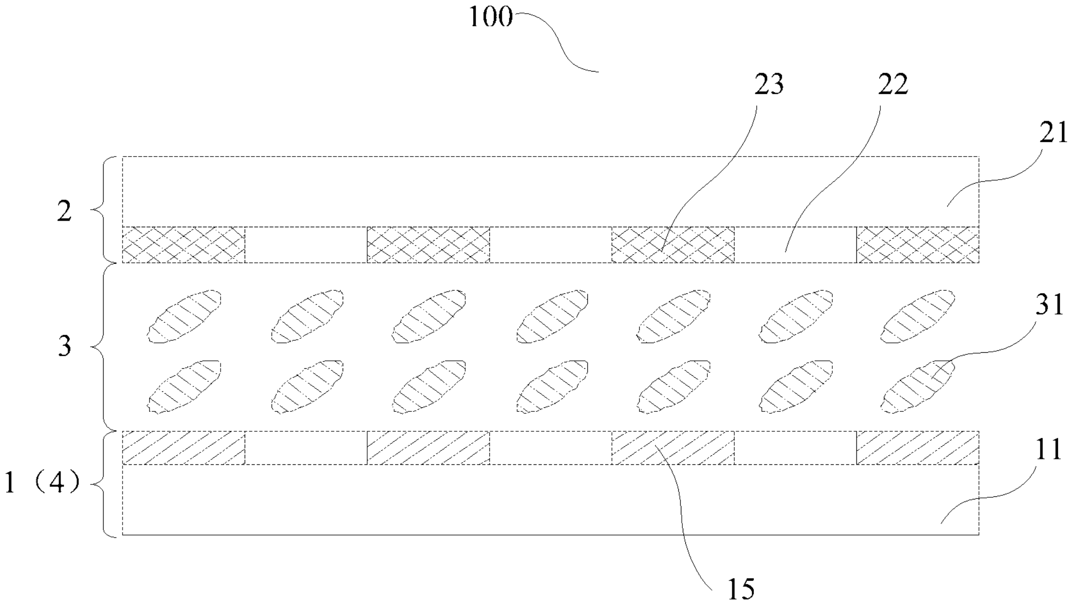
FIG. 2 is a structural schematic view of a display panel according to an embodiment of the present disclosure.

Referring to FIG. 2, FIG. 2 is a structural schematic view of a display panel according to an embodiment of the present disclosure.

The display panel 100 includes a first substrate 1 and a second substrate 2 facing each other. In the embodiments, the display panel 100 is an LCD panel, and the display panel 100 includes a first substrate 1, a second substrate 2, and a liquid crystal layer 3. The first substrate 1 and the second substrate 2 clamp the liquid crystal layer 3 disposed in a spacing space between the first substrate 1 and the second substrate 2. In some embodiments, the display panel 100 may be an LED panel. The LED has a size less than or equal to 200 μm. The LED may be a micron light emitting diode (Micro LED) or a mini light emitting diode (Mini LED), where the Mini LED has a size of 50 to 200 μm and the Micro LED has a size of less than 50 μm. The LED may also be classified as an ordinary monochromatic LED, a high brightness LED, an ultra-high brightness LED, a color-changing LED, a flicker LED, a voltage-controlled LED, an infrared LED, and a negative resistance LED, etc., without restriction herein. The following is mainly illustrated by the display panel 100 being an LCD panel as an example of the present disclosure.

The first substrate 1 is served as a driving substrate 4, the second substrate 2 is served as a color film substrate. The second substrate 2, also the color film substrate, includes a second base 21, a filter layer 22, and a black matrix layer 23 arranged on a side of the second base 21 near the driving substrate 4. The filter layer 22 includes three colors filter films as red, blue and green. The black matrix layer 23 can separate the three primary colors of red, green and blue in the filter layer 22 and prevent light leakage by virtue of a material with high light-blocking performance, thereby contributing to the improvement of the contrast of each color block. The filter layer 22 enables the full color display of the display panel 100. The material of the second base 21 is generally adopted with alkali-free borosilicate glass with excellent mechanical properties and heat and chemical resistance. The color film substrate may further include other functional layers, the same or similar to the related art, which will not be limited herein.

The liquid crystal layer 3 includes liquid crystals 31, which play a light valve-like role in the display and can control the brightness of the transmitted light, thereby achieving the effect of information display.

Figure 3:
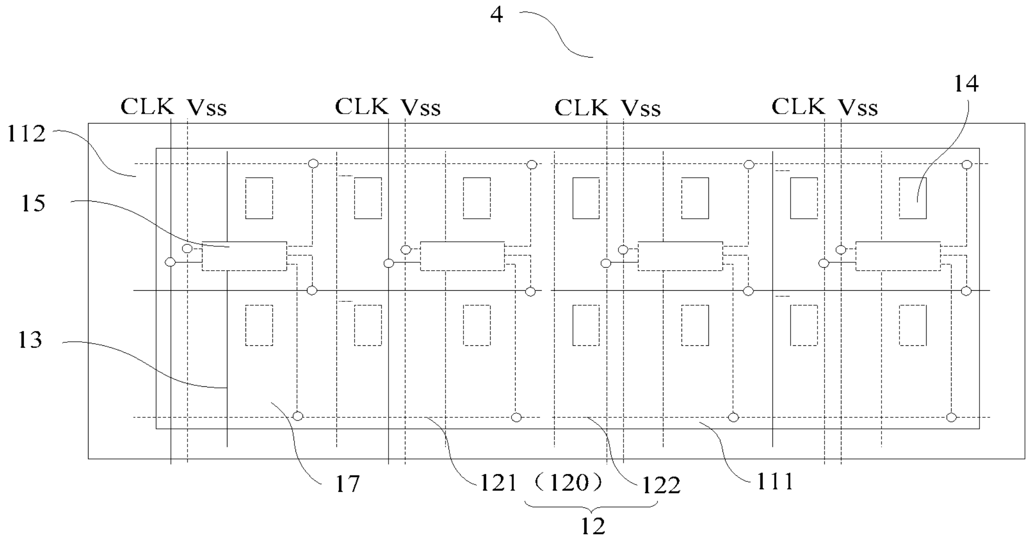
FIG. 3 is a structural schematic view of a driving substrate according to a first embodiment of the present disclosure.

Referring to FIGS. 2 and 3, FIG. 3 is a structural schematic view of a driving substrate according to a first embodiment of the present disclosure.

The first substrate 1 is served as the driving substrate 4, which includes a first base 11, a row scanning line 12, a data line 13, a pixel electrode 14, a scanning driving circuit 15, a clock signal line CLK, and a low-level signal line Vss. The first base 11 includes a display region 111 and a non-display region 112. The first base 11 is generally made of alkali-free borosilicate glass with excellent mechanical properties and heat and chemical resistance. Multiple row scanning lines 12 and multiple data lines 13 are arranged on a side of the first base 11 near the second substrate 2. The multiple row scanning lines 12 are arranged parallel to each other and the multiple data lines 13 are arranged parallel to each other. The multiple row scanning lines 12 and the multiple data lines 13 cross each other longitudinally and horizontally to define multiple pixel regions 17, and a pixel electrode 14 is arranged in each pixel region 17. The scanning driving circuit 15 is arranged in the display region 111 of the first base 11, and is connected to the row scanning lines 12 for outputting a gate scanning signal. The low-level signal line Vss is configured to provide a low-level signal. The clock signal line CLK is configured to provide a clock signal, and the voltages of the low-level signal line Vss and the clock signal line CLK are in opposite phases.

In the embodiments of the present disclosure, the multiple pixel regions 17 have a row direction parallel to the row scanning lines 12 and a column direction parallel to the row data lines 13. Each row of pixel regions 17 includes several pixel regions 17, and the pixel regions 17 in each row are sequentially arranged along a direction parallel to the row scanning lines 12. Each pixel region 17 includes at least one pixel electrode 14. i.e., there may be one pixel electrode 14 or multiple pixel electrodes 14 within each pixel region 17. For example, in a dual-gate driving circuit, there are two pixel electrodes 14 within each pixel region 17, and the two pixel electrodes 14 may be spaced along an extension direction of the data lines 13 or the row scanning lines 12, without limitation herein. In the embodiments, one pixel electrode 14 being included in one pixel region 17 is taken as an example for illustration.

Figure 4:
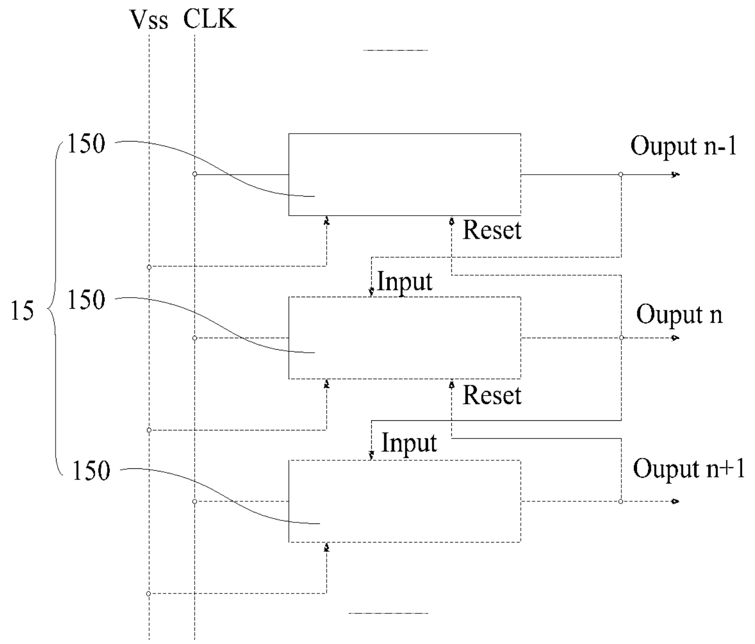
FIG. 4 is a cascade structural schematic view of a scanning driving circuit according to an embodiment of the present disclosure.

Referring to FIG. 4, FIG. 4 is a cascade structural schematic view of a scanning driving circuit according to an embodiment of the present disclosure.

The scanning driving circuit 15 is arranged on a side of the first substrate 1 near the second substrate 2 and is connected to the row scanning line 12, the clock signal line CLK, and the low-level signal line Vss, respectively. The scanning driving circuit 15 includes mutiple cascaded scanning driving units 150. An input signal (Input) of each level of the scanning driving unit 150 is an output signal (Ouput) of a previous level of the scanning driving unit 150, and a reset signal (Reset) of each level of the scanning driving unit 150 is the output signal of a next level of the scanning driving unit 150. For a first-level scanning driving unit 150, a frame start signal (not shown) is taken as the input signal since there is no previous level of the scanning driving unit 150. For the last level of the scanning driving unit 150, since there is no next level of the scanning driving unit 150 to provide the reset signal, an additional redundant scanning driving unit (not shown) may be designed, which provides the reset signal to the last level of the scanning driving unit 150. Each scanning driving unit 150 includes multiple thin film transistors (not shown) and at least one capacitor (not shown). The specific structure of the scanning driving unit 150 is similar to or the same as the related art, which may be specifically referred to the related art, and the internal structure of the scanning driving unit 150 will not be further described herein.

Referring to FIG. 3, the row scanning line 12 may be divided into at least two sub-scanning lines 120, with the sub-scanning lines 120 of each row scanning line 12 being co-linear and spaced apart. A spacing between each two adjacent sub-scanning lines 120 in the same row scanning line 12 may or may not be equal, as long as it is ensured that the pixel electrodes 14 in the same row are equally spaced along the extension direction of the row scanning line 12. Each sub-scanning line 120 is connected to output ends of two scanning driving units 150, respectively, to output a gate scanning signal to the same sub-scanning line 120 through the two scanning driving units 150. That is, one row scanning line 12 may be divided into multiple sub-scanning lines 120, and the two scanning driving units 150 jointly output the gate scanning signals to one sub-scanning line 120. By outputting the gate scanning signal for each sub-scanning line 120 separately, the driving load of the row scanning line 12 is reduced. It can be understood that since each sub-scanning line 120 is connected to the output ends of the two scanning driving units 150 respectively, i.e., the two scanning driving units 150 jointly output the gate scanning signals to the sub-scanning line 120, each sub-scanning line 120 has sufficient drive voltage, and even if one scanning driving unit 150 is broken, it can still be ensured that each sub-scanning line 120 works normally. In addition, the central control circuit 200 is connected to the display panel 100 and can output a control signal to the scanning driving unit 150 one by one, i.e., the central control circuit 200 can output a control signal to the scanning driving unit 150 connected to each sub-scanning line individually. In this way, when the display panel 100 is partially displaying an image, the thin film transistors of the display region 111 that are not used for displaying the image can be not driven, thereby saving power. For example, in FIG. 3, when only the left half of the display region 111 displays an image, the thin film transistors of the right half of the display region 111 may not be driven.

In some embodiments, each row scanning line 12 is divided equally into the same number of sub-scanning lines 120, and the segmented positions (i.e., disconnected positions) of each row scanning line 12 are aligned along the extension direction of the data lines 13. The following is an example of an implementation in which each row scanning line 12 is divided equally into two sub-scanning lines 120.

Each row scanning line 12 includes a first sub-scanning line 121 and a second sub-scanning line 122, with the first sub-scanning line 121 and the second sub-scanning line 122 arranged in a common straight line. Ends of the first sub-scanning lines 121 near the corresponding second sub-scanning lines 122 are flush with each other along the extension direction of the data lines 13. Ends of the second sub-scanning lines 122 near the corresponding first sub-scanning lines 121 are flush with each other along the extension direction of the data lines 13. Each scanning driving unit 150 is connected to the sub-scanning lines 120 of three different row scanning lines 12 for receiving an input signal, outputting a gate scanning signal, and receiving a reset signal, respectively. That is, each scanning driving unit 150 in the embodiments outputs the gate scanning signal to only one sub-scanning line 120. Each scanning driving unit 150 is connected to a clock signal line CLK and a low-level signal line Vss, respectively. The low-level signal lines Vss extend along the extension direction of the data lines 13 and are spaced from the data line 13. The clock signal lines CLK extend along the extension direction of the data lines 13 and are spaced from the data lines 13. In some embodiments, the clock signal line CLK and the low-level signal line Vss may be arranged perpendicular to each other or may be arranged parallel to and spaced apart from the row scanning lines 12. Each of the opposite ends of each sub-scanning line 120 is connected to the output end of a scanning driving unit 150, and the output end of each scanning driving unit 150 is connected to only one sub-scanning line 120. In other words, the two scanning driving units 150 jointly the output gate scanning signals to one sub-scanning line 120, and each scanning driving unit 150 outputs the gate scanning signal to only one sub-scanning line 120, and each scanning driving unit 150 is disposed in the pixel region 17 corresponding to the end of a corresponding sub-scanning line 120.

Figure 5:
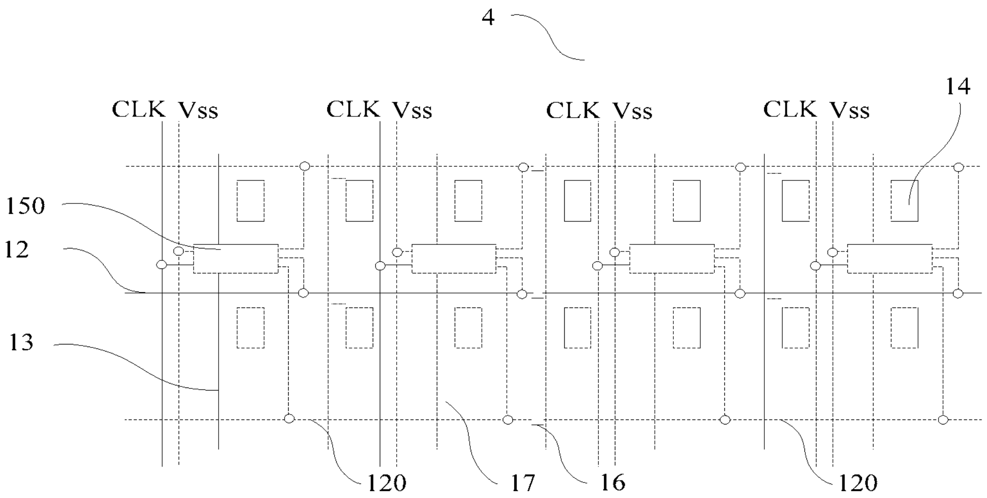
FIG. 5 is a structural schematic view of a driving substrate according to a second embodiment of the present disclosure.

Referring to FIG. 5, FIG. 5 is a structural schematic view of a driving substrate according to a second embodiment of the present disclosure.

The driving substrate 4 provided in the second embodiment of the present disclosure has substantially the same structure as the driving substrate 4 provided in the first embodiment, with the difference that a floating joint section 16 is further included.

Specifically, an interval of the two adjacent sub-scanning lines 120 of the same row scanning line 12 is arranged with a floating joint section 16, and each end of the floating joint section 16 is arranged corresponding to and insulated with an adjacent end of a corresponding two sub-scanning line 120. In other words, the floating joint section 16 is not in contact with each sub-scanning line 120 during normal operation of the sub-scanning line 120. The floating joint section 16 may be a conductive material such as conductive plastic, conductive rubber, conductive metal, etc. When the scanning driving unit 150 connected to one of the two adjacent sub-scanning lines 120 fails, the floating joint section 16 may be irradiated by laser to make the floating joint section 16 conductive with the adjacent ends of the corresponding two the sub-scanning lines 120. In this way, the two adjacent sub-scanning line 120 may be conducted with each other, such that the failed sub-scanning line 120 may be driven by the scanning driving unit 150 connected to another sub-scanning line 120 that is not failed. For example, when the scanning driving unit 150 connected to the first sub-scanning line 121 fails, the first sub-scanning line 121 is connected to the second sub-scanning line 122 via the floating joint section 16, and the scanning driving unit 150 connected to the second sub-scanning line 122 drives both the first sub-scanning line 121 and the second sub-scanning line 122. The floating joint section 16 may be arranged on the same layer as the data line 13; the floating joint section 16 may be arranged on the same layer as other signal lines that are not the row scanning lines 12; and the floating joint section 16 may be a specially provided conductive layer, which is not limited and may be selected according to the actual needs of the design. It can be understood that, compared to arranging the scanning driving unit 150 in the non-display region 112, the preparation process and connection lines are more complicated and prone to failure because the scanning driving unit 150 is arranged between the rows of pixel electrodes 14 of the display region 111. Once the scanning driving unit 150 fails, it is difficult to repair. By connecting two sub-scanning lines 120 through the floating joint section 16, the problem of a malfunction of the scanning driving unit 150 connected to a particular sub-scanning line 120 may be easily solved.

Figure 6:
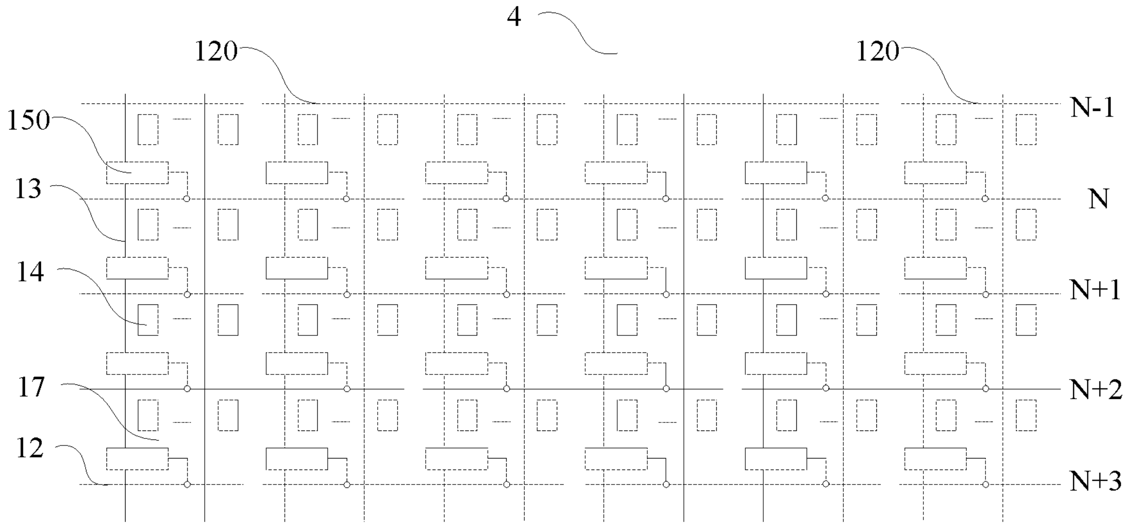
FIG. 6 is a structural schematic view of a driving substrate according to a third embodiment of the present disclosure.

Referring to FIG. 6, FIG. 6 is a structural schematic view of a driving substrate according to a third embodiment of the present disclosure.

The driving substrate 4 provided in the third embodiment of the present disclosure has substantially the same structure as the driving substrate 4 provided in the first embodiment, with the difference that the number of sub-scanning lines 120 included in each row scanning line 12 is not exactly the same.

Specifically, two adjacent row scanning lines 12 include different numbers of sub-scanning lines 120, and the segmented positions of the two adjacent row scanning lines 12 are staggered along the extension direction of the data lines 13. For example, each odd-numbered row scanning line 12 includes the same number of sub-scanning lines 120 and each even-numbered row scanning line 12 includes the same number of sub-scanning lines 120. The number of sub-scanning lines 120 included in the odd-numbered row scanning line 12 is different from the number of sub-scanning lines 120 included in the even-numbered row scanning line 12. In the embodiments, each of the odd-numbered row scanning lines 12 includes three sub-scanning lines 120, the odd-numbered row scanning lines 12 have two segmented positions set at intervals, and all of the two segmented positions of the odd-numbered row scanning lines 12 are aligned correspondingly; each of the even-numbered row scanning lines 12 includes four sub-scanning lines 120, the even-numbered row scanning lines 12 have three segmented positions, and all of the three segmented positions of the even-numbered row scanning lines 12 are aligned correspondingly. The output end of each scanning driving unit 150 is connected to a sub-scanning line 120 to output a gate scanning signal to the sub-scanning lines 120 and is arranged in the pixel region 17 corresponding to the row scanning line 12 in which the sub-scanning line 120 is located. In some embodiments, some of the two adjacent row scanning lines 12 include different numbers of sub-scanning lines 120, and some of the two adjacent row scanning lines 12 include the same number of sub-scanning lines 120, which are not limited here and may be designed according to actual needs. It can be understood that, due to the staggered setting of the segmented positions of the row scanning lines 12, the lightest and most severe load positions of each row scanning line 12 are also staggeredly arranged in the column direction accordingly, thereby making the display brightness of the display panel 100 more uniform and improving the display quality.

Figure 7:
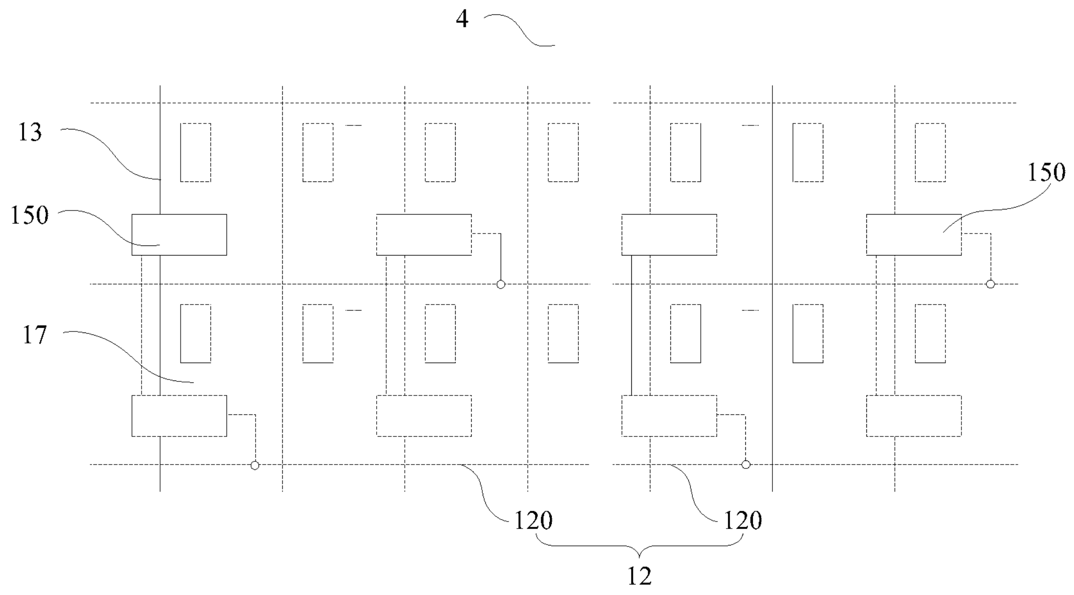
FIG. 7 is a structural schematic view of a driving substrate according to a fourth embodiment of the present disclosure.

Referring to FIG. 7, FIG. 7 is a structural schematic view of a driving substrate according to a fourth embodiment of the present disclosure.

The driving substrate 4 provided in the fourth embodiment of the present disclosure has substantially the same structure as the driving substrate 4 provided in the first embodiment, with the difference that the same scanning driving unit 150 is arranged in multiple rows of pixel regions 17.

Specifically, the same scanning driving unit 150 is arranged in at least two rows of pixel regions 17. It can be understood that the above may indicate that the same scanning driving unit 150 is arranged in pixel regions 17 which are located in at least two rows. In the embodiments, the same scanning driving unit 150 is arranged in two rows of pixel regions 17, and the output end of each scanning driving unit 150 is connected to a sub-scanning line 120 to output a gate scanning signal to the sub-scanning line 120. The scanning driving units 150 each with the output end connected to the odd-numbered row scanning line 12 have the same structure; the scanning driving units 150 each with the output end connected to the even-numbered row scanning line 12 have the same structure. The output ends of the scanning driving units 150 connected to each row scanning line 12 are spaced equally along the extension direction of the row scanning line 12, making the display brightness of the display panel 100 more uniform and improving the display quality. In some embodiments, the same scanning driving unit 150 is arranged in at least two columns of pixel region 17 to reduce the size of space occupied by the same scanning driving unit 150 in one column of pixel region 17, thereby increasing a pixel opening rate of the LCD panel or reducing a pixel pitch of the LED display panel to improve the resolution. It can be understood that the above may indicate that the same scanning driving unit 150 is arranged in pixel regions 17 which are located in at least two columns.

Figure 8:
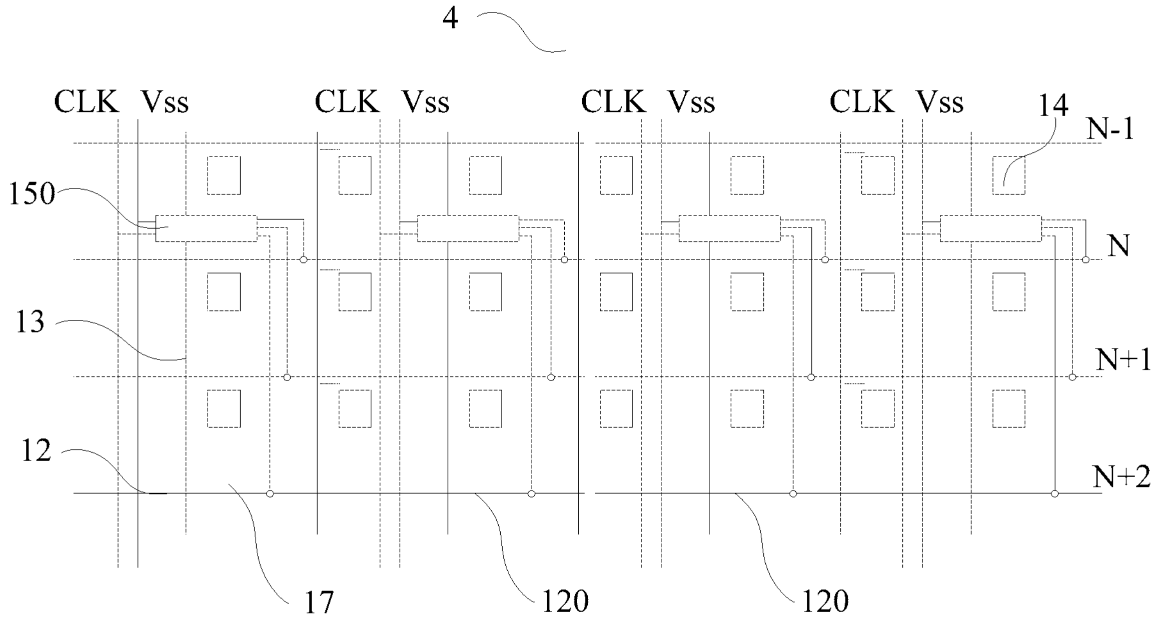
FIG. 8 is a structural schematic view of a driving substrate according to a fifth embodiment of the present disclosure.

Referring to FIG. 8, FIG. 8 is a structural schematic view of a driving substrate according to a fifth embodiment of the present disclosure.

The driving substrate 4 provided in the fifth embodiment of the present disclosure has essentially the same structure as the driving substrate 4 provided in the first embodiment, with the difference that the same scanning driving unit 150 can output a gate scanning signal to the row scanning line 12 corresponding to the pixel region 17 arranged at least one row apart from the scanning driving unit 150.

Specifically, a scanning driving unit 150 is arranged between the N−1th row scanning line 12 and the Nth row scanning line 12; the scanning driving unit 150 is connected to a sub-scanning line 120 of the Nth row scanning line 12 for receiving an output signal of a previous level. The scanning driving unit 150 is connected to a sub-scanning line 120 of the N+1th row scanning line 12 for outputting a gate scanning signal. The scanning driving unit 150 is connected to a sub-scanning line 120 of the N+2th row scanning line 12 for receiving an output signal of a next level. That is, the scanning driving unit 150 is arranged in the pixel region 17 corresponding to the Nth row scanning line 12 to output a gate scanning signal to a sub-scanning line 120 in the N+1st row scanning line 12. In some embodiments, the same scanning driving unit 150 can output a gate scanning signal to a sub-scanning line 120 of the row scanning line 12 corresponding to the pixel region 17 arranged two or more rows apart from the scanning driving unit 150. Since the same scanning driving unit 150 can output a gate scanning signal to the row scanning line 12 corresponding to the pixel region 17 arranged at least one row apart, when remaining alignments (e.g., high-level signal line Vdd, sense signal line, etc.) are arranged in the pixel region 17, the scanning driving unit 150 can output a gate scanning signal to the scanning line 12 corresponding to the pixel region 17 with the remaining alignments. After the remaining alignments, which are conventionally arranged in the non-display region 112, are placed in the display region 111, a bezel-less design of the upper and lower bezels of the display may be realized without affecting the placement of the scanning driving unit 150 in the display region 111 at both ends along the extension direction of the data lines 13.

Figure 9:
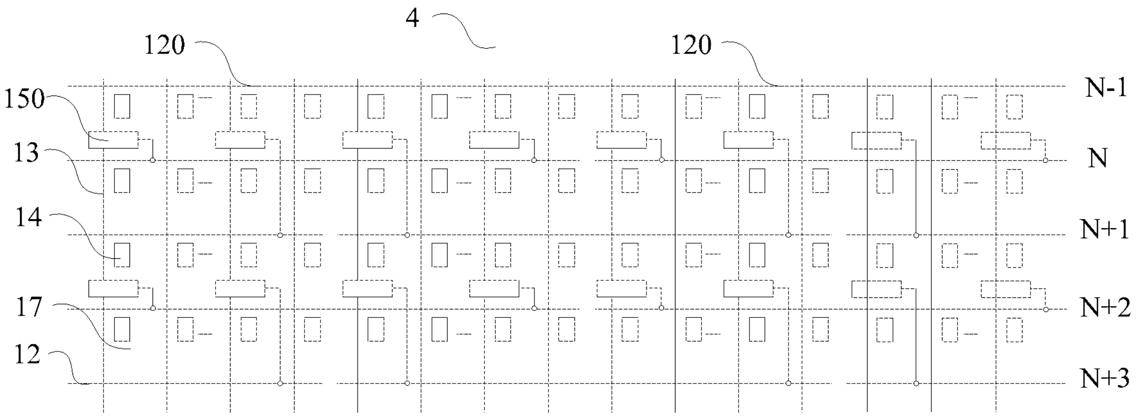
FIG. 9 is a structural schematic view of a driving substrate according to a sixth embodiment of the present disclosure.

Referring to FIG. 9, FIG. 9 is a structural schematic view of a driving substrate according to a sixth embodiment of the present disclosure.

The driving substrate 4 provided in the sixth embodiment of the present disclosure has substantially the same structure as the driving substrate 4 provided in the third embodiment, with the difference that a row of pixel regions 17 in each two adjacent rows of pixel regions 17 are not arranged with a scanning driving unit 150.

Specifically, the odd-numbered row scanning lines 12 each include two sub-scanning lines 120, the odd-numbered row scanning lines 12 have one segmented staggeredly arranged, and the two segmented positions of all the odd-numbered row scanning lines 12 are aligned correspondingly; the even-numbered row scanning lines 12 each include three sub-scanning lines 120, the even-numbered row scanning lines 12 have two segmented positions, and the two segmented positions of all the even-numbered row scanning lines 12 are aligned correspondingly. Each of the opposite ends of each sub-scanning line 120 is connected to the output end of a scanning driving unit 150, and the output end of each scanning driving unit 150 is connected to only one sub-scanning line 120. Since the segmented position of the odd-numbered row scanning line 12 is arranged in a staggered position with the segmented position of the even-numbered row scanning line 12, the two rows of scanning driving units 150 that were originally aligned are arranged in a staggered position, such that the scanning driving unit 150 connected to the odd-numbered row scanning line 12 and the scanning driving unit 150 connected to the even-numbered row scanning line 12 may be arranged in the same row.

In the embodiments, the scanning driving unit 150 is arranged in the pixel regions 17 corresponding to the odd-numbered row scanning lines 12, and no scanning driving unit 150 is arranged in the pixel regions 17 corresponding to the even-numbered row scanning lines 12. It is understood that under the premise of outputting a gate scanning signal for each row scanning line 12, one of the two adjacent rows of pixel regions 17 does not have a scanning driving unit 150, which improves the pixel opening rate of the LCD panel or reduces the pixel pitch of the LED display panel to improve the resolution.

Figure 10:
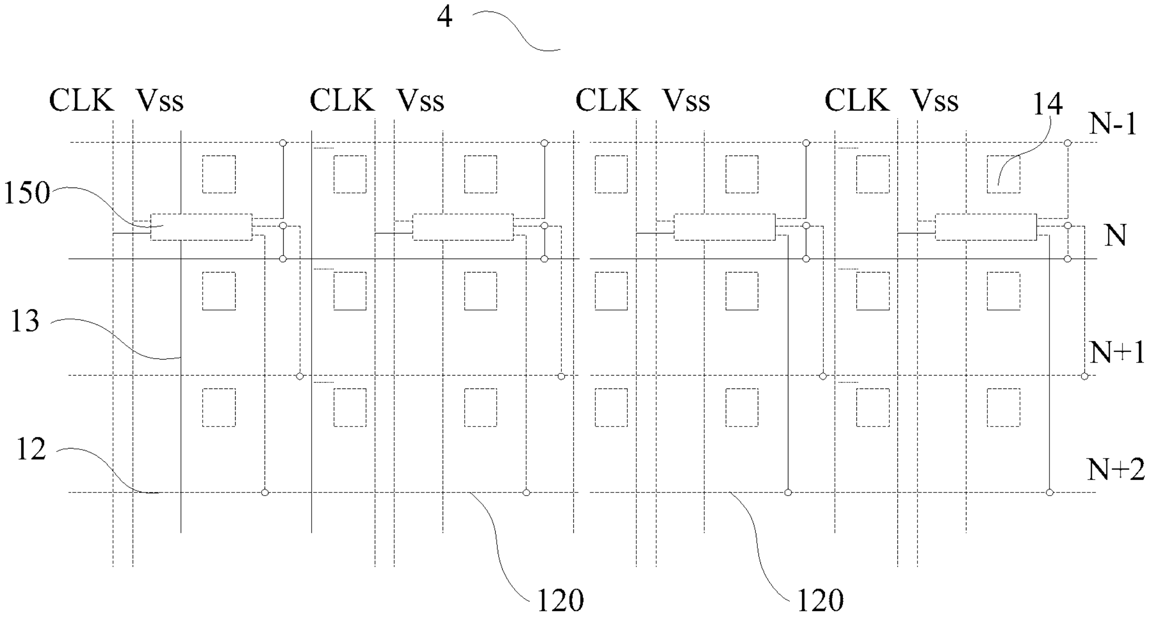
FIG. 10 is a structural schematic view of a driving substrate according to a seventh embodiment of the present disclosure.

Referring to FIG. 10, FIG. 10 is a structural schematic view of a driving substrate according to a seventh embodiment of the present disclosure.

The driving substrate 4 provided in the seventh embodiment of the present disclosure has substantially the same structure as the driving substrate 4 provided in the first embodiment, with the difference that the same scanning driving unit 150 can output gate scanning signals to multiple sub-scanning lines 120.

Specifically, the same scanning driving unit 150 outputs gate scanning signals for at least two sub-scanning lines 120 located in different row scanning lines 12. In the embodiments, the output end of the same scanning driving unit 150 is connected to each of the two sub-scanning lines 120 to output a gate scanning signals for each sub-scanning line 120. The same scanning driving unit 150 is connected to each of four row scanning lines 12. That is, when the scanning driving unit 150 is arranged between the N−1th row scanning line 12 and the Nth row scanning line 12, the scanning driving unit 150 is connected to a sub-scanning line 120 of the N−1th row scanning line 12 for receiving an output signal of a previous level. The scanning driving unit 150 is connected to a sub-scanning line 120 of the Nth scanning line 12 and the N+1th row scanning line 12, respectively, for outputting the gate scanning signal. The scanning driving unit 150 is connected to a sub-scanning line 120 of the N+2th row scanning line 12 for receiving an output signal of a next level. In some embodiments, when the same scanning driving unit 150 can output the gate scanning signals to three or more sub-scanning lines 120, the output end of the same scanning driving unit 150 is connected to the multiple sub-scanning lines 120 respectively. One scanning driving unit 150 outputs the gate scanning signal to multiple sub-scanning lines 120 located in different row scanning lines 12, which may reduce the number of scanning driving units 150, such that that the row spacing between two rows of pixel regions 17 may be less, thereby increasing the pixel opening rate.

Disclosed are a driving substrate, a display panel, and a display device. The driving substrate is applied to a display panel and includes a base; a plurality of data lines and a plurality of row scanning lines, arranged on a side of the base; and a scanning driving circuit, arranged on the side of the base and including a plurality of scanning driving units that are cascaded. Each row scanning line includes at least two sub-scanning lines, and the scanning driving circuit is configured to output a gate scanning signal to each sub-scanning line. The present disclosure may save power by dividing each row scanning line into multiple sub-scanning lines and separately outputting the gate scanning signal for each sub-scanning line, making it possible to drive only part of the thin-film transistor in each row when only part of the display region of the display panel is used for displaying images.

The above is only some embodiments of the present disclosure and is not intended to limit the scope of the present disclosure. Any equivalent structure or equivalent process transformation using the specification and the accompanying drawings of the present disclosure, or direct or indirect application in other related technical fields, is included in the scope of the present disclosure.

What is claimed is:

1. A driving substrate, applied to a display panel and comprising:
- a base;
- a plurality of data lines and a plurality of row scanning lines, arranged on a side of the base; and
- a scanning driving circuit, arranged on the side of the base and comprising a plurality of scanning driving units that are cascaded;
- wherein each row scanning line comprises at least two sub-scanning lines, and the scanning driving circuit is configured to output a gate scanning signal to each sub-scanning line; and the plurality of data lines and the plurality of row scanning lines cross longitudinally and horizontally to define a plurality of pixel regions, and each scanning driving unit is disposed in one pixel region that corresponds to an end of a corresponding sub-scanning line.

2. The driving substrate according to claim 1, wherein for each sub-scanning line: the sub-scanning line is connected to an output end of each of two of the plurality of scanning driving units, such that the scanning driving circuit is configured to output the gate scanning signal to the sub-scanning line through the two of the plurality of scanning driving units.

3. The driving substrate according to claim 2, wherein each of opposite ends of the sub-scanning line is connected to the output end of a corresponding one of the two of the plurality of scanning driving units; the output end of each scanning driving unit is connected to a corresponding sub-scanning line of each of at least one of the plurality of row scanning lines.

4. The driving substrate according to claim 1, wherein for each row scanning line, the at least two sub-scanning lines are equally divided; each row scanning line has a same number N of the at least two sub-scanning lines; for each row scanning line, a segmented position is located between each two of the at least two sub-scanning lines, and the segmented positions of the row scanning line are defined as a $1^{st}$ segmented position, a $2^{nd}$ segmented position, a $3^{rd}$ segmented position, . . . , and an $N-1^{th}$ segmented position, along an extension direction of the row scanning line; the $1^{st}$ segmented position of each row scanning line is located in a same line along an extension direction of the plurality of data lines, the $2^{nd}$ segmented position of each row scanning line is located in another same line along the extension direction of the plurality of data lines, the $3^{rd}$ segmented position of each row scanning line is located in another same line along the extension direction of the plurality of data lines, . . . , and the $N-1^{th}$ segmented position of each row scanning line is located in another same line along the extension direction of the plurality of data lines.

5. The driving substrate according to claim 1, wherein for each row scanning line, the number of the at least two sub-scanning lines of the row scanning line is different from the number of the at least two sub-scanning lines of another row scanning line adjacent to the row scanning line; a segmented position is located between each two of the at least two sub-scanning lines of each row scanning line, and for each row scanning line: the segmented positions of the row scanning line are staggeredly arranged with the segmented positions of another row scanning line adjacent to the row scanning line along an extension direction of the plurality of data lines.

6. The driving substrate according to claim 5, wherein the plurality of row scanning lines are defined as a Pt row scanning line, a $2^{nd}$ row scanning line, a $3^{rd}$ row scanning line, . . . , along the extension direction of the plurality of data lines, such that the plurality of row scanning lines are divided into an odd-numbered row scanning line group and an even-numbered row scanning line group; each row scanning line in the odd-numbered row scanning line group has a same first number of the at least two sub-scanning lines, and each row scanning line in the even-numbered row scanning line group has a same second number of the at least two sub-scanning lines, the first number being different from the second number.

7. The driving substrate according to claim 1, wherein an interval between each adjacent two of the at least two sub-scanning lines of one of the plurality of row scanning lines is arranged with a floating joint section; an end of the floating joint section faces and is insulated with an end of one of the corresponding adjacent two sub-scanning lines near the end of the floating joint section, and another end of the floating joint section faces and is insulated with an end of the other of the corresponding adjacent two sub-scanning lines near the end of the floating joint section.

8. The driving substrate according to claim 1, wherein a row direction of the plurality of pixel regions is parallel to the plurality of row scanning lines, and only one of each two adjacent rows of the plurality of pixel regions is arranged with corresponding ones of the plurality of scanning driving units; or each scanning driving unit is arranged in at least two of the plurality of pixel regions, and the at least two of the plurality of pixel regions are located in different rows.

9. A display panel, comprising a driving substrate;

wherein the driving substrate comprises:

a base;

a plurality of data lines and a plurality of row scanning lines, arranged on a side of the base; and a scanning driving circuit, arranged on the side of the base and comprising a plurality of scanning driving units that are cascaded;

wherein each row scanning line comprises at least two sub-scanning lines, and the scanning driving circuit is configured to output a gate scanning signal to each sub-scanning line; and the plurality of data lines and the plurality of row scanning lines cross longitudinally and horizontally to define a plurality of pixel regions, and each scanning driving unit is disposed in one pixel region that corresponds to an end of a corresponding sub-scanning line.

10. The display panel according to claim 9, wherein for each sub-scanning line: the sub-scanning line is connected to an output end of each of two of the plurality of scanning driving units, such that the scanning driving circuit is configured to output the gate scanning signal to the sub-scanning line through the two of the plurality of scanning driving units.

11. The display panel according to claim 10, wherein each of opposite ends of the sub-scanning line is connected to the output end of a corresponding one of the two of the plurality of scanning driving units; the output end of each scanning driving unit is connected to a corresponding sub-scanning line of each of at least one of the plurality of row scanning lines.

12. The display panel according to claim 9, wherein for each row scanning line, the at least two sub-scanning lines are equally divided; each row scanning line has a same number N of the at least two sub-scanning lines; for each row scanning line, a segmented position is located between each two of the at least two sub-scanning lines, and the segmented positions of the row scanning line are defined as a $1^{st}$ segmented position, a $2^{nd}$ segmented position, a $3^{rd}$ segmented position, . . . , and an $N-1^{th}$ segmented position, along an extension direction of the row scanning line; the $1^{st}$ segmented position of each row scanning line is located in a same line along an extension direction of the plurality of data lines, the $2^{nd}$ segmented position of each row scanning line is located in another same line along the extension direction of the plurality of data lines, the $3^{rd}$ segmented position of each row scanning line is located in another same line along the extension direction of the plurality of data lines, . . . , and the $N-1^{th}$ segmented position of each row scanning line is located in another same line along the extension direction of the plurality of data lines.

13. The display panel according to claim 9, wherein for each row scanning line, the number of the at least two sub-scanning lines of the row scanning line is different from the number of the at least two sub-scanning lines of another row scanning line adjacent to the row scanning line; a segmented position is located between each two of the at least two sub-scanning lines of each row scanning line, and for each row scanning line: the segmented positions of the row scanning line are staggeredly arranged with the segmented positions of another row scanning line adjacent to the row scanning line along an extension direction of the plurality of data lines.

14. The display panel according to claim 13, wherein the plurality of row scanning lines are defined as a $1^{st}$ row scanning line, a $2^{nd}$ row scanning line, a $3^{rd}$ row scanning line, . . . , along the extension direction of the plurality of data lines, such that the plurality of row scanning lines are divided into an odd-numbered row scanning line group and an even-numbered row scanning line group; each row scanning line in the odd-numbered row scanning line group has a same first number of the at least two sub-scanning lines, and each row scanning line in the even-numbered row scanning line group has a same second number of the at least two sub-scanning lines, the first number being different from the second number.

15. The display panel according to claim 9, wherein an interval between each adjacent two of the at least two sub-scanning lines of one of the plurality of row scanning lines is arranged with a floating joint section; an end of the floating joint section faces and is insulated with an end of one of the corresponding adjacent two sub-scanning lines near the end of the floating joint section, and another end of the floating joint section faces and is insulated with an end of the other of the corresponding adjacent two sub-scanning lines near the end of the floating joint section.

16. The display panel according to claim 9, wherein a row direction of the plurality of pixel regions is parallel to the plurality of row scanning lines, and only one of each two adjacent rows of the plurality of pixel regions is arranged with corresponding ones of the plurality of scanning driving units; or each scanning driving unit is arranged in at least two of the plurality of pixel regions, and the at least two of the plurality of pixel regions are located in different rows.

17. A display device, comprising a central control circuit and a display panel; wherein the central control circuit is connected to the display panel and is capable of individually output a control signal to at least one of the plurality of scanning driving units that is connected to each sub-scanning line;

wherein the display comprises a driving substrate comprising:

a base;

a plurality of data lines and a plurality of row scanning lines, arranged on a side of the base; and a scanning driving circuit, arranged on the side of the base and comprising a plurality of scanning driving units that are cascaded;

wherein each row scanning line comprises at least two sub-scanning lines, and the scanning driving circuit is configured to output a gate scanning signal to each sub-scanning line; and the plurality of data lines and the plurality of row scanning lines cross longitudinally and horizontally to define a plurality of pixel regions, and each scanning driving unit is disposed in one pixel region that corresponds to an end of a corresponding sub-scanning line.

18. The display device according to claim 17, wherein for each sub-scanning line: the sub-scanning line is connected to an output end of each of two of the plurality of scanning driving units, such that the scanning driving circuit is configured to output the gate scanning signal to the sub-scanning line through the two of the plurality of scanning driving units.

19. The display device according to claim 17, wherein for each row scanning line, the number of the at least two sub-scanning lines of the row scanning line is different from the number of the at least two sub-scanning lines of another row scanning line adjacent to the row scanning line; a segmented position is located between each two of the at least two sub-scanning lines of each row scanning line, and for each row scanning line: the segmented positions of the row scanning line are staggeredly arranged with the segmented positions of another row scanning line adjacent to the row scanning line along an extension direction of the plurality of data lines.

20. The display device according to claim 19, wherein the plurality of row scanning lines are defined as a Pt row scanning line, a $2^{nd}$ row scanning line, a $3^{rd}$ row scanning line, . . . , along the extension direction of the plurality of data lines, such that the plurality of row scanning lines are divided into an odd-numbered row scanning line group and an even-numbered row scanning line group; each row scanning line in the odd-numbered row scanning line group has a same first number of the at least two sub-scanning lines, and each row scanning line in the even-numbered row scanning line group has a same second number of the at least two sub-scanning lines, the first number being different from the second number.

* * * * *